(12) United States Patent
Okawa et al.

(10) Patent No.: US 6,639,002 B2
(45) Date of Patent: Oct. 28, 2003

(54) THERMOPLASTIC RESIN COMPOSITION AND ITS INJECTION MOLDED ARTICLE

(75) Inventors: Kenichi Okawa, Ichihara (JP); Moriyasu Shimojo, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/277,203

(22) Filed: Oct. 22, 2002

(65) Prior Publication Data

US 2003/0100664 A1 May 29, 2003

(30) Foreign Application Priority Data

Oct. 26, 2001 (JP) ......................................... 2001-328892

(51) Int. Cl.$^7$ ................................................. C08K 3/34
(52) U.S. Cl. ........................ 524/442; 526/451; 526/515; 526/502; 526/505
(58) Field of Search ................................ 524/451, 442, 524/515, 505, 502

(56) References Cited

U.S. PATENT DOCUMENTS 6,011,102 A * 1/2000 Shimojo et al. ............ 524/451

FOREIGN PATENT DOCUMENTS

| JP | 07-286022 A | 10/1995 |
| JP | 07-286075 A | 10/1995 |

* cited by examiner

*Primary Examiner*—David W. Wu
*Assistant Examiner*—William Cheung
(74) *Attorney, Agent, or Firm*—Sughrue Mion, PLLC

(57) ABSTRACT

Disclosed is a thermoplastic resin composition comprising (A) 35 to 85% by weight of a polypropylene resin, (B) 10 to 35% by weight of an elastomer, (C) 2 to 30% by weight of an inorganic filler and (D) 5 to 15% by weight of a resin, wherein the resin (D) has a melt tension (MT), measured at a winding speed of 15.7 m/min, of not less than 0.03 N and less than 0.1 N and a swelling ratio (SR), measured at 220° C., an L/D of an orifice of 40 and a shear rate of $1.2 \times 10^3$ sec$^{-1}$, of 1.8 or more, and the time required for the resin (D) until the ratio (G(t)/G(0.02)) of the relaxation elastic modulus G(t) measured at 210° C. to the relaxation elastic modulus G(0.02) in a time of 0.02 second reaches 0.01 is not less than 5 seconds and less than 10 seconds.

7 Claims, No Drawings

THERMOPLASTIC RESIN COMPOSITION AND ITS INJECTION MOLDED ARTICLE

BACKGROUND OF THE INVENTION

1. Field of the Invention

The present invention relates to a thermoplastic resin composition which is excellent in rigidity, impact resistance and flowability and which provides, when molded, molded articles having excellent appearance, in particular, having no noticeable flow marks. In addition, the present invention relates to an injection-molded article comprising the thermoplastic resin composition.

2. Description of the Related Art

Polypropylene-based resins have been used widely in materials required to have rigidity, impact strength and the like. Polypropylene-based resins have recently been used widely, particularly, as materials for automobiles, and especially, ethylene-propylene block copolymers are used increasingly. Although ethylene-propylene block copolymers have conventionally been produced by a solvent method, the ethylene-propylene block copolymers have recently been produced by a continuous gas phase method which comprises a simple production process and by which the ethylene-propylene block copolymer can be produced at low cost.

However, an ethylene-propylene block copolymer produced by the gas phase method has, in general, problems that, due to a lower limiting viscosity $[\eta]_{EP}$ of an ethylene-propylene copolymer portion, the swelling ratio (SR) is low, flow marks are noticeable and molded articles produced therefrom have poor appearance, and that when the limiting viscosity $[\eta]_{EP}$ of an ethylene-propylene copolymer portion of the ethylene-propylene block copolymer produced by the gas phase method is increased, pimples are formed and molded articles produced therefrom have poor appearance.

For solving the problems regarding appearance described above, for example, JP-A-07-286022 discloses a propylene-based block copolymer produced by a batchwise solvent method, a n-decane (23° C.)-insoluble component of which has a limiting viscosity of 0.1 to 20 dl/g, a n-decane (23° C.)-soluble component of which has a limiting viscosity of 5 to 15 dl/g, and from which molded articles can be formed without formation of pimples in their appearance. However, as disclosed in Comparative Example 3 in the foregoing document, an ethylene-propylene block copolymer a n-decane (23° C.)-soluble component, which is considered to be an ethylene-propylene block copolymer portion, of which shows a high limiting viscosity contains many rubber granules which will cause pimples.

JP-A-07-286075 discloses a propylene polymer composition comprising a propylene polymer produced in a continuous mode and an ethylene-propylene block copolymer a n-decane (23° C.)-soluble component of which shows a limiting viscosity of 5 to 12 dl/g and from which molded articles can be formed without formation of pimples in appearance. However, the amount of the ethylene-propylene block copolymer compounded is as high as 12% by weight or more.

SUMMARY OF THE INVENTION

The object of the present invention is to provide a thermoplastic resin composition which is excellent in rigidity, impact resistance and flowability and which provides, when molded, molded articles having excellent appearance, in particular, having no noticeable flow marks, and to provide an injection-molded article comprising the thermoplastic resin composition.

The present invention relates to a thermoplastic resin composition comprising (A) from 35 to 85% by weight of a polypropylene resin, (B) from 10 to 35% by weight of an elastomer (B), (C) from 2 to 30% by weight of an inorganic filler and (D) from 5 to 15% by weight of a resin, wherein the resin (D) has a melt tension (MT), measured at a winding speed of 15.7 m/min, of not less than 0.03 N and less than 0.1 N and a swelling ratio (SR), measured at 220° C., an L/D of an orifice of 40 and a shear rate of $1.2 \times 10^3$ sec$^{-1}$, of 1.8 or more, and the time required for the resin (D) until the ratio (G(t)/G(0.02)) of the relaxation elastic modulus G(t) measured at 210° C. to the relaxation elastic modulus G(0.02) in a time of 0.02 second reaches 0.01 is not less than 5 seconds and less than 10 seconds.

The present invention also relates to an injection-molded article comprising the above-mentioned thermoplastic resin composition.

DESCRIPTION OF THE PREFERRED EMBODIMENTS

The propylene-based resin (A) used in the present invention is not particularly restricted, and preferably, is a polypropylene resin with crystallinity, examples of which include a crystalline propylene homopolymer, a crystalline ethylene-propylene copolymer, a crystalline propylene-α-olefin copolymer and the like. Two or more of these polymers may be used in combination.

The α-olefin used in the crystalline propylene-α-olefin copolymer is an α-olefin having 4 or more carbon atoms, preferably 4 to 20 carbon atoms, more preferably 4 to 12 carbon atoms, examples of which include butene-1, pentene-1, hexene-1, heptene-1, octene-1 and decene-1. Examples of the crystalline propylene-α-olefin copolymer include a crystalline propylene-butene-1 copolymer and a crystalline propylene-hexene-1 copolymer.

The crystalline polypropylene resin with crystallinity is preferably a crystalline propylene homopolymer, a crystalline ethylene-propylene block copolymer or a mixture of thereof, more preferably a crystalline ethylene-propylene block copolymer or a mixture of a crystalline propylene homopolymer and a crystalline ethylene-propylene block copolymer.

The crystalline ethylene-propylene block copolymer used in the present invention is a crystalline ethylene-propylene block copolymer comprised of a propylene homopolymer portion (referred to as a "first segment") and an ethylene-propylene random copolymer portion (referred to as a "second segment").

The propylene homopolymer portion, the first segment, preferably has a Q value, which is a ratio of weight average molecular weight (Mw)/number average molecular weight (Mn) determined by gel permeation chromatography (GPC), of from 3.0 to 5.0, more preferably from 3.5 to 4.5. The first segment preferably has an isotactic pentad fraction calculated based on $^{13}$C-NMR of 0.98 or more, more preferably 0.99 or more. Further, the limiting viscosity $[\eta]_P$ of a 135° C. tetralin solution of the first segment is preferably from 0.7 to 0.1 dl/g, more preferably from 0.8 to 1.0 dl/g.

The ethylene-propylene random copolymer portion, the second segment, has an limiting viscosity $[\eta]_{EP}$ of a 135° C. tetralin solution of from 1.0 to 8.0 dl/g, preferably from 1.5 to 7.5 dl/g. Further, the second segment preferably has an ethylene content $[(C2')_{EP}]$ of from 25 to 35% by weight, more preferably from 27 to 33% by weight.

The weight ratio of the ethylene-propylene random copolymer portion (second segment) to the propylene homopolymer portion (first segment), second segment/first segment ratio, is preferably from 8/92 to 35/65.

The crystalline propylene homopolymer used in the above-mentioned mixture of the crystalline ethylene-propylene block copolymer and the crystalline propylene homopolymer is a polymer having physical properties similar to those of the propylene homopolymer portion which is the first segment of the crystalline ethylene-propylene block copolymer. Preferred is that having a Q value, which is a ratio of weight average molecular weight (Mw)/number average molecular weight (Mn) determined by gel permeation chromatography (GPC), of from 3.0 to 5.0, more preferably from 3.5 to 4.5. The crystalline homopolymer preferably has an isotactic pentad fraction calculated based on $^{13}$C-NMR of 0.98 or more, more preferably 0.99 or more. Further, the limiting viscosity $[\eta]_P$ of a 135° C. tetralin solution of the crystalline homopolymer is preferably from 0.7 to 0.1 dl/g, more preferably from 0.8 to 1.0 dl/g.

A method for producing the polypropylene resin used in the present invention is not particularly restricted, and the polypropylene resin can be produced, for example, by a known polymerization method such as bulk polymerization, solution polymerization, slurry polymerization or gas phase polymerization, or any arbitrary combination of these polymerization methods using a known catalyst such as a Ziegler-Natta catalyst system and/or a metallocene catalyst system. Preferred is a continuous gas phase polymerization.

In particular, the crystalline ethylene-propylene block copolymer is preferably that produced by homopolymerizing propylene in the presence of a stereoregular olefin polymerization catalyst in the first step to obtain a crystalline propylene homopolymer portion as a first segment, and subsequently copolymerizing ethylene and propylene in the second step to obtain an ethylene-propylene random copolymer portion as a second segment.

The compounding proportion of the polypropylene resin (A) is from 35 to 85% by weight, preferably from 40 to 80% by weight and more preferably from 45 to 75% by weight based on the total amount of the components (A), (B), (C) and (D).

When the compounding proportion of the polypropylene resin (A) is less than 35% by weight, the rigidity may decrease, whereas when over 85% by weight, the impact resistance may decrease.

The elastomer (B) used in the present invention is not particularly restricted, and preferred is one containing a rubber component. For example, an elastomer comprised of a vinyl aromatic compound-containing rubber and/or an ethylene-alpha-olefin random copolymer rubber, and the like are listed.

Preferable examples of the vinyl aromatic compound-containing rubber used in the present invention are block copolymers made up of a vinyl aromatic compound polymer block and a conjugated diene-based polymer block. Preferred are those in which 80% or more, more preferably 85 or more of double bonds of the conjugated diene portion is hydrogenated. The rubber preferably has a molecular weight distribution (Q value) determined by GPC (gel permeation chromatography) of 2.5 or less, more preferably 2.3 or less. The average content of a vinyl aromatic compound in the vinyl aromatic compound-containing rubber is preferably from 10 to 20% by weight, more preferably from 12 to 19% by weight. Further, the melt flow rate (MFR, JIS-K-6758, 230° C.) of the vinyl aromatic compound-containing rubber is preferably from 1 to 15 g/10 min, more preferably from 2 to 13 g/10 min.

Examples of the above-mentioned vinyl aromatic compound-containing rubber include block copolymers such as styrene-ethylene-butene-styrene-based rubber (SEBS), styrene-ethylene-propylene-styrene-based rubber (SEPS), styrene-butadiene-based rubber (SBR), styrene-butadiene-styrene-based rubber (SBS), styrene-isoprene-styrene-based rubber (SIS), and the like, and block copolymers obtained by hydrogenation of those rubber components. A rubber obtained by allowing a vinyl aromatic compound such as styrene to react with an ethylene-propylene-non-conjugated diene-based rubber (EPDM) may also be used suitably. Further, two or more of vinyl aromatic compound-containing rubbers may also be used together.

The method for the production of the above-mentioned vinyl aromatic compound-containing rubber is not particularly restricted, and, for example, is a method in which a vinyl aromatic compound is bonded, by polymerization, reaction or the like, to an olefin-based copolymer rubber or conjugated diene rubber.

The ethylene-α-olefin random copolymer rubber of the present invention is a random copolymer rubber made up of ethylene and an α-olefin and it is not particularly restricted as long as it is such a rubber. The α-olefin is an α-olefin having 3 or more carbon atoms, preferably 3 to 20 carbon atoms, more preferably 3 to 12 carbon atoms, such as propylene, butene-1, pentene-1, hexene-1, heptene-1, octene-1 and decene-1. Preferred are propylene, butene-1, hexene-1 and octene-1.

Examples of the ethylene-α-olefin random copolymer rubber include an ethylene-propylene random copolymer rubber, an ethylene-butene-1 random copolymer rubber, an ethylene-hexene-1 random copolymer rubber and an ethylene-octene-1 random copolymer rubber. Preferred are an ethylene-octene-1 random copolymer rubber, an ethylene-butene-1 random copolymer rubber or an ethylene-propylene random copolymer rubber. In addition, two or more kinds of ethylene-α-olefin random copolymer rubbers may be used in combination.

The ethylene-octene-1 random copolymer rubber is a random copolymer rubber made up of ethylene and octene-1. The ethylene-octene-1 random copolymer rubber preferably has a molecular weight distribution (Q value), which is determined by GPC (gel permeation chromatography), of 2.5 or less, more preferably 2.3 or less. The ethylene-octene-1 random copolymer rubber preferably has an octene-1 content of from 15 to 45% by weight, more preferably from 18 to 42% by weight. In addition, the ethylene-octene-1 random copolymer rubber preferably has a melt flow rate (MFR, JIS-K-6758, 190° C.) of from 1.0 to 15 g/10 min, more preferably from 2 to 13 g/10 min.

The ethylene-butene-1 random copolymer rubber that can be used in the present invention is a random copolymer made up of ethylene and butene-1. The ethylene-butene-1 random copolymer rubber preferably has a Q value determined by GPC of 2.7 or less, more preferably 2.5 or less. The ethylene-butene-1 random copolymer rubber preferably has a butene-1 content of from 15 to 35% by weight, more preferably from 17 to 33% by weight. In addition, the ethylene-butene-1 random copolymer rubber preferably has a melt flow rate (MFR, JIS-K-6758, 190° C.) of from 1 to 15 g/10 min, more preferably from 2 to 13 g/l min.

The ethylene-propylene random copolymer rubber which can be used in the present invention is a random copolymer rubber made up of ethylene and propylene. The ethylene-propylene random copolymer rubber preferably has a molecular weight distribution (Q value), which is determined by GPC (gel permeation chromatography), of 2.7 or less, more preferably 2.5 or less. The ethylene-propylene random copolymer rubber preferably has a propylene content of from 20 to 30% by weight, more preferably from 22 to 28% by weight. In addition, the ethylene-propylene random copolymer rubber preferably has a melt flow rate (MFR, JIS-K-6758, 190° C.) of from 1 to 15 g/10 min, more preferably from 2 to 13 g/10 min.

The method of the production the above-mentioned ethylene-α-olefin random copolymer rubber is not particularly restricted and can be produced by copolymerizing ethylene with an α-olefins by a known polymerization method using a known catalyst. Examples of the known catalyst include a catalyst system consisting of a vanadium compound and an organoaluminum compound, a Ziegler-Natta catalyst system or a metallocene catalyst system. Examples of the known polymerization method include solution polymerization, slurry polymerization, high pressure ion polymerization or gas phase polymerization method.

The compounding proportion of the elastomer (B) used in the present invention is from 10 to 35% by weight, preferably from 15 to 30% by weight. When the content of the elastomer (B) is less than 10% by weight, impact strength of injection molded articles to be obtained from the resin composition may decrease, while when over 35% by weight, rigidity and heat resistance of injection molded articles may decrease.

The inorganic filler (C) which can be used in the present invention is not particularly restricted so far as the rigidity is improved. Examples thereof include calcium carbonate, barium sulfate, mica, crystalline calcium silicate, talc and magnesium sulfate fiber. Preferred are talc and/or magnesium sulfate fiber.

Talc used in the present invention is not particularly restricted, and preferred is one obtained by grinding hydrous magnesium silicate. The crystal structure of molecules thereof is a pyrophyllite type three-layer structure. Talc comprises a lamination of this structure, and particularly is a tabular powder resulting from fine pulverization of crystals almost to unit layers.

Talc used in the present invention preferably has an average particle size of 3 $\mu$m or less. The average particle size of talc means a 50% equivalent particle size $D_{50}$ determined from an integrated distribution curve by a minus sieve method made by suspending talc in a dispersion medium such as water and alcohol using a centrifugal sedimentation type particle size distribution measuring apparatus.

Talc may be used as received without any treatment. Alternatively, talc which has been surface-treated with known various silane coupling agents, titanium coupling agents, higher fatty acids, higher fatty esters, higher fatty amides, salts of higher fatty acids or other surfactants for the purpose of improving interfacial adhesion with the polypropylene resin (A) and improving the dispersability.

The magnesium sulfate fiber which can be used in the present invention is not particularly restricted, and preferably has an average fiber length of from 5 to 50 $\mu$m, more preferably from 10 to 30 $\mu$m. The magnesium sulfate fiber preferably has an average fiber diameter of from 0.3 to 2.0 $\mu$m, more preferably from 0.5 to 1.0 $\mu$m.

The compounding proportion of the inorganic filler used in the present invention is from 2 to 30% by weight, preferably from 5 to 30% by weight, more preferably from 10 to 30% by weight based on the total amount of the components (A), (B), (C) and (D). When the compounding proportion of the inorganic filler is less than 2% by weight, the rigidity may decrease, whereas when over 30% by weight, impact strength may be insufficient, and in addition, appearance may also deteriorate.

The resin (D) used in the present invention is a resin which can improve the swelling ratio (SR) of a polypropylene resin composition, and has a melt tension (MT), measured at 190° C. and a winding rate of 15.7 m/min, of not less than 0.03 N and less than 0.1 N, preferably from 0.05 to 0.08 N. If the MT is less than 0.03 N, the appearance of molded articles may be unsatisfactory. On the other hand, if the MT is not less than 0.1 N, the flowability may be reduced.

The resin (D) has a swelling ratio (SR), measured at 220° C., an L/D ratio of an orifice of 40 and a shear rate of $1.2 \times 10^3$ sec$^{-1}$ of 1.8 or more, preferably 2.0 or more. When the swelling ratio (SR) is less than 2.0, the appearance of molded articles may be insufficient.

The time required for the resin (D) until the ratio (G(t)/G(0.02)) of the relaxation modulus G(t) measured at 210° C. to the relaxation modulus G (0.02) in a time of 0.02 sec measured at 210° C. reaches 0.01 is not less than 5 seconds and less than 10 seconds, preferably not less than 7 seconds and less than 10 seconds. If that time is less than 5 seconds, the appearance of molded articles may be unsatisfactory. On the other hand, if that time is not less than 10 seconds, the flowability may be reduced.

Examples of the resin (D) used in the present invention include propylene-based polymers. The resin (D) preferably comprises a propylene-based polymer obtained by polymerizing, in a first stage, monomers mainly comprised of propylene to produce a crystalline propylene-based polymer component (1) having a limiting viscosity of 5 dl/g or more and successively polymerizing, in and after a second stage, monomers mainly comprised of propylene to continuously produce a crystalline propylene-based polymer component (2) having a limiting viscosity of less than 3 dl/g wherein the content of the crystalline propylene-based polymer component (1) in the propylene-based polymer is not less than 0.05% by weight and less than 25% by weight and wherein the propylene-based polymer has a limiting viscosity of less than 3 dl/g and a molecular weight distribution (Mw/Mn) of less than 10.

The compounding proportion of the resin (D) used in the present invention is from 5 to 15% by weight based on the total amount of the components (A), (B), (C) and (D).

The thermoplastic resin composition of the present invention can be produced using a kneader such as a single-screw extruder, a twin-screw extruder, a Banbury mixer and a heat roll. Addition and mixing of components into a kneader can be conducted simultaneously or divisionally. The method for the addition and mixing, may be, but is not restricted to, the following methods.

(Method 1)

A method in which a polypropylene resin (A) and an inorganic filler (C) are kneaded, an elastomer (B) is subsequently added to the mixture, and then, a resin (D) is kneaded.

(Method 2)

A method in which an inorganic filler (C) is previously kneaded in high concentration with a polypropylene resin (A) to obtain a master batch, the master batch is diluted with a polypropylene resin (A), an elastomer (B) or the like, and then, a resin (D) is kneaded.

(Method 3)

A method in which a polypropylene resin (A) and elastomer (B) are kneaded, an inorganic filler (C) is added to the mixture, and then, a resin (D) is kneaded.

(Method 4)

A method in which an elastomer (B) is previously kneaded in high concentration with a polypropylene resin (A) to obtain a master batch, a polypropylene resin (A) and an inorganic filler (C) are added to the master batch, and then, a resin (D) is kneaded.

(Method 5)

A method in which a polypropylene resin (A) and an inorganic filler (C), and a polypropylene resin (A) and elastomer (B) are previously kneaded, respectively, thereafter, they are combined, and then, a resin (D) is kneaded.

The kneading temperature is usually from 170 to 250° C., more preferably from 190 to 230° C. The kneading time is usually from 1 to 20 minutes, more preferably from 3 to 15 minutes.

Further, in these kneaders, additives such as an antioxidant, an ultraviolet absorber, a lubricant, a pigment, an antistatic agent, a copper inhibitor, a flame retardant, a neutralizing agent, a foaming agent, a plasticizer, a nucleating agent, a foam inhibitor, a crosslinking agent and the like may also be optionally compounded in addition to the components (A), (B), (C) and (D) used in the present invention, unless the object and effect of the present invention are lost.

The thermoplastic resin composition of the present invention can be generally molded into an injection-molded article by a known injection molding. Particularly, the injection-molded article is suitably used as parts for automobiles such as a door trim, pillar, instrumental panel, bumper and the like.

The present invention will be explained with reference to the following examples, which are mere examples and to which the invention is not restricted.

Methods for measuring physical properties of the resin components and the compositions used in examples and comparative examples are shown below.

(1) Melt Flow Rate (MFR, Unit: g/10 min)

Melt flow rate was measured according to a method defined in JIS-K-6758. Unless other wise stated, it was measured at a measurement temperature of 230° C. and a load of 2.16 kg.

(2) Flexural Modulus (FM, Unit: MPa)

Flexural modulus was measured according to a method defined in JIS-K-7203. It was measured under a load rate of 2.0 or 30 mm/min at a measurement temperature of 23° C. using a specimen having a thickness of 6.4 mm and a span length of 100 mm prepared by injection molding.

(3) Izod Impact Strength (Izod, Unit: kJ/m$^2$)

Izod impact strength was measured according to a method defined in JIS-K-7110. It was measured at a measurement temperatures of 23° C. and −30° C. using a specimen having a thickness of 6.4 mm prepared by injection molding and having a notch formed by notch processing after the molding.

(4) Heat Distortion Temperature (HDT, Unit: ° C.)

Heat distortion temperature was measured according to a method defined in JIS-K-7207. It was measured at a fiber stress of 1.82 MPa.

(5) Rockwell Hardness (HR)

Rockwell hardness was measured according to a method defined in JIS-K-7202. It was measured using a specimen having a thickness of 3.0 mm prepared by injection molding. The measurements are shown in R scale.

(6) Brittle Temperature (BP, Unit: ° C.)

Brittle temperature was measured according to a method defined in JIS-K-7216. A given specimen of 6.3×38×2 mm was punched out from a flat plate of 25×150×2 mm molded by injection molding, and the measurement was conducted using this specimen.

(7) Intrinsic Viscosity (Unit: dl/g)

Reduced viscosities were measured at three points of concentrations of 0.1, 2 and 0.5 g/dl using a Ubbellohde type viscometer. Intrinsic viscosity was calculated by a calculation method described on page 491 in "Kobunshi Yoeki (Polymer Solution), Kobunshi Jikkengaku (Polymer Experiment Study) 11" (published by Kyoritsu Shuppan K.K., 1982), namely, by an extrapolation method in which reduced viscosities are plotted against concentrations and the concentration is extrapolated in zero.

Regarding a crystalline polypropylene, the intrinsic viscosity was measured at a temperature of 135° C. using tetralin as a solvent.

(7-1) Limiting Viscosity of Crystalline Ethylene-propylene Block Copolymer (7-1a) Limiting Viscosity of Propylene Homopolymer Portion (First Segment): $[\eta]_P$ The limiting viscosity: $[\eta]_P$ of a propylene homopolymer portion which is a first segment of a crystalline ethylene-propylene block copolymer was measured as follows. A propylene homopolymer was sampled from a polymerization reactor during its production after polymerization of the propylene homopolymer portion as the first step. The propylene homopolymer sampled was measured for limiting viscosity $[\eta]_P$.

(7-1b) Limiting Viscosity of Ethylene-propylene Random Copolymer Portion (Second Segment): $[\eta]_{EP}$ The limiting viscosity $[\eta]_{EP}$ of an ethylene-propylene random copolymer portion which is a second segment of a crystalline ethylene-propylene block copolymer was determined by measuring the limiting viscosity, $[\eta]_P$, of a propylene homopolymer portion and the limiting viscosity, $[\eta]_T$, of the total ethylene-propylene block copolymer, respectively, and effecting calculation according to the following equation using weight ratio, X, of the ethylene-propylene random copolymer portion to the total crystalline ethylene-propylene block copolymer.

$$[\eta]_{EP}=[\eta]_T/X-(1/X-1)[\eta]_P$$

$[\eta]_P$: Limiting viscosity of propylene homopolymer portion (dl/g)

$[\eta]_T$: Limiting viscosity of total block copolymer (dl/g)

(7-1c) Weight Ratio of Ethylene-Propylene Random Copolymer Portion to Total Crystalline Ethylene-Propylene Block Copolymer: X The weight ratio, X, of an ethylene-propylene random copolymer portion to the total crystalline ethylene-propylene block copolymer was obtained by measuring the crystal fusion heats of a propylene homopolymer portion (first segment) and the total crystalline ethylene-propylene block copolymer, respectively, and effecting calculation using the following equation. The crystal fusion heat was measured by differential scanning calorimetry (DSC).

$$X=1-(\Delta H_f)_T/(\Delta H_f)_P$$

$(\Delta H_f)_T$: Fusion heat of total block copolymer (cal/g)

$(\Delta H_f)_P$: Fusion heat of propylene homopolymer portion (cal/g)

(8) Ethylene Content of Ethylene-propylene Random Copolymer Portion in Crystalline Ethylene-propylene Block Copolymer: $(C2')_{EP}$ The ethylene content, $(C2')_{EP}$, of an ethylene-propylene random copolymer portion in a crystalline ethylene-propylene block copolymer was determined by measuring the ethylene content $(C2')_T$ (wt %) of the total crystalline ethylene-propylene block copolymer by infrared absorption spectrometry, and effecting calculation using the following equation.

$$(C2')_{EP} = (C2')_T / X$$

$(C2')_T$: Ethylene content (wt %) of total block copolymer $(C2')_{EP}$: Ethylene content (wt %) of ethylene-propylene random copolymer portion X: Weight ratio of ethylene-propylene random copolymer portion to total crystalline ethylene-propylene block copolymer (9) Isotactic Pentad Fraction The isotactic pentad fraction is a fraction of propylene monomer units existing at the center of an isotactic chain in the form of a pentad unit, in other words, the center of a chain in which five propylene monomer units are meso-bonded successively, in the polypropylene molecular chain as measured by a method disclosed in A. Zambelli et al., Macromolecules, 6,925 (1973), namely, by use of $^{13}$C-NMR. However, the assignment of NMR absorption peaks was conducted based on Macromolecules, 8, 687 (1975) published thereafter.

Specifically, the isotactic pentad fraction was measured as an area fraction of mmmm peaks in all absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G. B. was measured to be 0.944.

(10) Molecular Weight Distribution (Q Value)

Gel permeation chromatograph (GPC) was measured under the following conditions.

GPC: Model 150C, manufactured by Waters

Column: Shodex 80 MA, two columns, manufactured by Showa Denko K.K.

Amount of sample: 300 μl (polymer concentration: 0.2 wt %)

Flow rate: 1 ml/min

Temperature: 135° C.

Solvent: o-Dichlorobenzene

A calibration curve of eluted volume vs. molecular weight was prepared using a standard polystyrene manufactured by Tohso Corporation. The polystyrene-reduced weigh average molecular weight and number average molecular weight were calculated using the calibration curve, and the Q value, which is a scale of molecular weight distribution, was calculated according to weigh average molecular weight/number average molecular weight.

(11) Melt Tension (MT, Unit: N)

The melt tension was measured according to the following conditions using a melt tension tester RE2 manufactured by Toyo Seiki Seisaku-Sho, Ltd.

Measurement temperature: 190° C.

Winding rate: 15.7 mm/min

(12) Swelling Ratio (SR)

The swelling ratio was measured according to the following conditions using a Capillograph 1B manufactured by Toyo Seiki Seisaku-Sho, Ltd.

Measurement temperature: 220° C.

L/D: 40

Shear rate: $1.2 \times 10^3$ sec$^{-1}$

(13) Time Required Until Ratio of Relaxation Elastic Modulus G(t) to Relaxation Elastic Modulus G(0.2) in Time of 0.02 sec Reaches 0.01

The time required until the ratio of relaxation elastic modulus G(t) to relaxation elastic modulus G(0.2) in a time of 0.02 sec reaches 0.01 was measured according to the following conditions using a mechanical spectrometer RMS-800 manufactured by Rheometrics Co., Ltd.

Measurement mode: Stress Relaxation

Measurement temperature: 210° C.

Plate form: 25 mmφ Parallel plate

Distance between plates: 1.9 mm

Amount of strain: 0.2

Applied strain: 0.2

(14) Appearance

The appearance of a specimen prepared by injection molding was observed visually and was judged to be good or poor.

(Production of Injection Molded Article)

Specimens which are injection-molded articles for evaluation of physical properties in the above-mentioned (2), (3), (4), (5), (6) and (14) were manufactured by the following method. A composition was dried in a hot air drier at 120° C. for 2 hours, and then injection-molded with an injection molding machine, model IS150E-V, manufactured by Toshiba Machine Co., Ltd. at a molding temperature of 220° C., a mold cooling temperature of 50° C., an injection time of 15 sec and a cooling time of 30 sec, resulting in a specimen.

(Production of Thermoplastic Resin Composition)

A thermoplastic resin composition was produced by the following method. Predetermined amounts of components were weighed, preliminarily mixed homogenously in a Henschel mixer or tumbler mixer, then, kneaded and extruded with a twin-screw kneading extruder (TEX44SS 30BW-2V type, manufactured by The Japan Steel Works, Ltd.) at an extrusion rate of from 30 to 50 kg/hr and a screw revolution of 350 rpm under vent suction, resulting in a composition. The screw was constructed by arranging a triple thread type rotor and a kneading disc in two kneading zones which are the zone subsequent to a first feed inlet and the zone subsequent to a second feed inlet, respectively.

The physical properties of the polypropylene resins (A) used in Examples 1 to 3 and Comparative Examples 1 to 5 are shown in Table 1. The physical properties of the elastomers (B) used in Examples 1 to 3 and Comparative Examples 1 to 5 are shown in Table 2.

The compounding proportions (% by weight) of the individual components in the thermoplastic resin compositions of Examples 1 to 3 are shown in Table 3. The compounding proportions of the individual components in the thermoplastic resin compositions of Comparative Examples 1 to 5 are shown in Tables 4.

The physical properties of the thermoplastic resin compositions of Examples 1 to 3 and the physical properties and appearances of the injection-molded articles obtained by use of the compositions are shown in Table 5. The physical properties of the thermoplastic resin compositions of Comparative Examples 1 to 5 and the physical properties and appearances of the injection-molded articles obtained by use of the compositions are shown in Table 6.

The inorganic fillers (C) used in Examples 1 to 3 and Comparative Examples 1 to 5 were talc.

The resins (D) used in Examples 1 to 3 and Comparative Examples 2 to 4 were a polypropylene polymer which had a melt tension (MT), measured at 190° C. and a winding rate of 15.7 m/min, of 0.065 N and a swelling ratio (SR), measured at 220° C., an L/D of an orifice of 40 and a shear rate of $1.2 \times 10^3$ sec$^{-1}$, of 2.89, and whose time required until the ratio (G(t)/G(0.02)) of the relaxation elastic modulus G(t) measured at 210° C. to the relaxation elastic modulus G(0.02) in a time of 0.02 sec reaches 0.01 was 8.6 seconds.

In the polypropylene polymer, a component polymerized in a first stage had a limiting viscosity of 8.9 dl/g, the content thereof was 9.7% by weight and a component polymerized in a second stage had a limiting viscosity of 1.04 dl/g.

The resin (D') used in Comparative Example 5 was an ethylene-propylene block copolymer which had a melt tension (MT), measured at 190° C. and a winding rate of 15.7 m/min, of 0.003 N and a swelling ratio (SR), measured at 220° C., an L/D of an orifice of 40 and a shear rate of $1.2 \times 10^3$ sec$^{-1}$, of 1.54, and whose time required until the ratio (G(t)/G(0.02)) of the relaxation elastic modulus G(t) measured at 210° C. to the relaxation elastic modulus G(0.02) in a time of 0.02 sec reaches 0.01 was 0.3 second.

The propylene homopolymer portion of the ethylene-propylene block copolymer, resin (D'), had a limiting viscosity $[\eta]_P$ of 0.94 dl/g. The ethylene-propylene random copolymer portion of the ethylene-propylene block copolymer had a limiting viscosity $[\eta]_{EP}$ of 5.0 dl/g. The content of the ethylene-propylene random copolymer portion in the ethylene-propylene block copolymer was 12.0% by weight and the ethylene content of the ethylene-propylene random copolymer portion was 32.0% by weight.

TABLE 1

| | P Portion | | | EP Portion | | |
|---|---|---|---|---|---|---|
| Sample | Q | $[\eta]_P$ (dl/g) | mmmm | $[\eta]_{EP}$ (dl/g) | Content 1 (% by weight) | Content 2 (% by weight) |
| BC-1 | 3.5 | 1.00 | 0.97 | 2.1 | 18.0 | 40.0 |
| PP-1 | 4.0 | 0.77 | 0.99 | — | — | — |
| PP-2 | 4.0 | 0.94 | 0.99 | — | — | — |

BC: Ethylene-propylene block copolymer
PP: Propylene homopolymer
P Portion: Propylene homopolymer portion of ethylene-propylene block copolymer, or whole propylene homopolymer
EP Portion: Ethylene-propylene random copolymer portion of ethylene-propylene block copolymer
Content 1: Content of ethylene-propylene random copolymer portion in ethylene-propylene block copolymer
Content 2: Content of ethylene in ethylene-propylene random copolymer portion
mmmm: Isotactic pentad fraction

TABLE 2

| | MFR (g/10 minutes) | | Comonomer Content | Styrene Content |
|---|---|---|---|---|
| Sample | 190° C. | 230° C. | (% by weight) | (% by weight) |
| SEBS-1 | — | 6 | — | 18 |
| EBR-1 | 2 | — | 32 | — |
| EOR-1 | 2 | — | 40 | 1 |

SEBS-1: Vinyl aromatic compound-containing rubber (Tuftec H1062, manufactured by Asahi Kasei Corporation)
EBR-1: Ethylene-butene-1 copolymer rubber (Esprene SPO N0411, manufactured by Sumitomo Chemical Co., Ltd.)
EOR-1: Ethylene-octene-1 copolymer rubber (Engage EG8842, DuPont Dow Elastomers L.L.C.)

TABLE 3

| | | Example 1 | Example 2 | Example 3 |
|---|---|---|---|---|
| Composition (% by weight) | BC-1 | 23 | 23 | 23 |
| | PB-1 | 26 | 21 | 16 |
| | PP-2 | — | — | — |
| | SEBS-1 | 8.1 | 8.1 | 8.1 |
| | EBR-1 | 8 | 8 | 8 |
| | EOR-1 | 7.4 | 7.4 | 7.4 |
| | Talc | 21 | 21 | 21 |
| | Resin (D) | 5 | 10 | 15 |

TABLE 4

| | | Comparative Example | | | | |
|---|---|---|---|---|---|---|
| | | 1 | 2 | 3 | 4 | 5 |
| Composition (% by weight) | BC-1 | 23 | 23 | 23 | 23 | 23 |
| | PP-1 | 15 | 15 | 20 | 11 | 21 |
| | PP-2 | 16 | 15 | 8 | — | — |
| | SEBS-1 | 8.1 | 8.1 | 8.1 | 8.1 | 8.1 |
| | EBR-1 | 8 | 8 | 8 | 8 | 8 |
| | EOR-1 | 7.4 | 7.4 | 7.4 | 7.4 | 7.4 |
| | Talc | 21 | 21 | 21 | 21 | 21 |
| | Resin (D) | — | 1 | 3 | 20 | — |
| | Resin(D') | — | — | — | — | 10 |

TABLE 5

| | Example 1 | Example 2 | Example 3 |
|---|---|---|---|
| MFR (g/10 minutes) | 44.0 | 34.6 | 23.5 |
| FM (MPa) | 1918 | 1916 | 1905 |
| Izod 23° C. (kJ/m$^2$) | 50.5 | 56.3 | 66.0 |
| −30° C. | 5.9 | 6.0 | 6.7 |
| HDT (° C.) | 68.5 | 66.2 | 65.6 |
| HR | 59.4 | 58.6 | 56.9 |
| BP (° C.) | −27.5 | −26.0 | −31.4 |
| Appearance | Good | Good | Good |

TABLE 6

| | Comparative Example | | | | |
|---|---|---|---|---|---|
| | 1 | 2 | 3 | 4 | 5 |
| MFR (g/10 minutes) | 45.7 | 44.9 | 43.3 | 22.3 | 42.2 |
| FM (MPa) | 1898 | 1886 | 1908 | 1873 | 1775 |
| Izod 23° C. (kJ/m$^2$) | 57.3 | 54.7 | 57.0 | 65.9 | 61.7 |
| −30° C. | 6.5 | 6.7 | 6.1 | 7.0 | 8.0 |
| HDT (° C.) | 66.5 | 67.0 | 67.4 | 65.2 | 63.8 |
| HR | 58.9 | 58.3 | 58.8 | 56.5 | 51.3 |
| BP (° C.) | −32.3 | −31.6 | −29.7 | −29.7 | −35.5 |
| Appearance | Poor | Poor | Poor | Poor | Poor |

Examples 1 to 3 are directed to thermoplastic resin compositions satisfying the requirements of the present invention. It is clear that the thermoplastic resin compositions are of high flowability and excellent in balance between rigidity (flexural modulus (FM), heat distortion temperature (HDT) and Rockwell hardness (HR)) and impact strength (Izod impact strength (Izod) and brittle temperature (BP)), and that the appearance of the injection-molded articles is good.

On the contrary, Comparative Example 1 is directed to a thermoplastic resin composition using no resin (D), which is one of the requirements of the present invention. It is clear that the appearance of an injection-molded article is poor.

Comparative Examples 2 to 4 are directed to thermoplastic resin compositions which do not satisfy the compounding amount of resin (D) which is one of the requirements of the present invention. It is clear that the appearance of the injection-molded articles is poor.

In addition, Comparative Example 5 is directed to a thermoplastic resin composition using a resin (D') which does not satisfy the melt tension (MT) measure at 190° C. and a winding-up speed of 15.7 m/min, the swelling ratio (SR) measured at 220° C., an L/D of an orifice of 40 and a shear rate of $1.2 \times 10^3$ sec$^{-1}$, and the time required until the ratio (G(t)/G(0.02)) of the relaxation elastic modulus G(t) measured at 210° C. to the relaxation elastic modulus G(0.02) in a time of 0.02 second reaches 0.01, of the resin (D) that is one of the requirements of the present invention. It is clear that the appearance of an injection-molded article is poor.

As described in detail above, a thermoplastic resin composition which is excellent in rigidity, impact resistance and flowability and which provides, when molded, molded articles having excellent appearance, and an injection-molded article comprising the thermoplastic resin composition can be obtained according to the present invention.

What is claimed is:

1. A thermoplastic resin composition comprising (A) from 35 to 85% by weight of a polypropylene resin, (B) from 10 to 35% by weight of an elastomer, (C) from 2 to 30% by weight of an inorganic filler and (D) from 5 to 15% by weight of a resin, wherein the resin (D) has a melt tension (MT), measured at a winding speed of 15.7 m/min, of not less than 0.03 N and less than 0.1 N and a swelling ratio (SR), measured at 220° C., an L/D of an orifice of 40 and a shear rate of $1.2 \times 10^3$ sec$^{-1}$, of 1.8 or more, and the time required for the resin (D) until the ratio (G(t)/G(0.02)) of the relaxation elastic modulus G(t) measured at 210° C. to the relaxation elastic modulus G(0.02) in a time of 0.02 second reaches 0.01 is not less than 5 seconds and less than 10 seconds, provided that the percentages are based on the total amount of the components (A), (B), (C) and (D).

2. The thermoplastic resin composition according to claim 1, wherein the thermoplastic resin (A) comprises a propylene homopolymer and/or an ethylene-propylene block copolymer and the content of the thermoplastic resin (A) is from 40 to 80% by weight based on the total amount of the components (A), (B), (C) and (D).

3. The thermoplastic resin composition according to claim 1, wherein the elastomer (B) comprises a vinyl aromatic compound-containing rubber and/or an ethylene-α-olefin copolymer and the content of the elastomer (B) is from 15 to 30% by weight based on the total amount of the components (A), (B), (C) and (D).

4. The thermoplastic resin composition according to claim 1, wherein the inorganic filler (C) is talc and/or magnesium sulfate fiber and the content of the filler (C) is from 5 to 30% by weight based on the total amount of the components (A), (B), (C) and (D).

5. The thermoplastic resin composition according to claim 1, wherein the resin (D) has a the melt tension, measured at a temperature of 190° C. and a winding rate of 15.7 m/min, of 0.15 N or more, a swelling ratio, measured at a temperature of 220° C., an L/D ratio of an orifice of 40 and a shearing rate of $1.2 \times 10^3$ sec$^{-1}$, of 2.0 or more and the time required for the resin (D) until the ratio (G(t)/G(0.02)) of the relaxation elastic modulus G(t) measured at 210° C. to the relaxation elastic modulus G(0.02) in a time of 0.02 second reaches 0.01 is not less than 4 seconds and less than 10 seconds, and the content of the resin (D) is from 5 to 12% by weight based on the total amount of the components (A), (B), (C) and (D).

6. The thermoplastic resin composition according to claim 1, wherein the resin (D) comprises a propylene-based polymer obtained by polymerizing, in a first stage, monomers mainly comprised of propylene to produce a crystalline propylene-based polymer component (1) having a limiting viscosity of 5 dl/g or more and successively polymerizing, in and after a second stage, monomers mainly comprised of propylene to continuously produce a crystalline propylene-based polymer component (2) having a limiting viscosity of less than 3 dl/g wherein the content of the crystalline propylene-based polymer component (1) in the propylene-based polymer is not less than 0.05% by weight and less than 25% by weight and wherein the propylene-based polymer has a limiting viscosity of less than 3 dl/g and a molecular weight distribution (Mw/Mn) of less than 10.

7. An injection-molded article comprising the thermoplastic resin composition according to any one of claims 1–6.

* * * * *